United States Patent [19]

Canziani

[11] Patent Number: 4,712,965
[45] Date of Patent: Dec. 15, 1987

[54] PLANT FOR SORTING ITEMS, WITH SELF DRIVEN CARRIAGES

[76] Inventor: Francesco Canziani, Via Contardo Ferrini 21, 21010 San Macario (Varese), Italy

[21] Appl. No.: 738,769

[22] Filed: May 29, 1985

[51] Int. Cl.⁴ .............................................. B65G 67/00
[52] U.S. Cl. ..................................... 414/339; 104/88; 104/140; 198/365
[58] Field of Search ................. 414/339; 104/245, 247, 104/172 S, 107; 198/365, 836, 708, 822, 831; 105/30, 153; 213/40 R

[56] References Cited

U.S. PATENT DOCUMENTS

| | | | |
|---|---|---|---|
| 2,608,163 | 8/1952 | Martin | 105/153 |
| 3,114,540 | 12/1963 | Brake | 213/40 R X |
| 3,391,652 | 7/1968 | Lauber . | |
| 3,727,560 | 4/1973 | Blemly et al. | 104/247 X |
| 3,848,728 | 11/1974 | Leibrick et al. . | |
| 3,908,554 | 9/1975 | Schwarzkopf | 104/245 X |
| 3,912,071 | 10/1975 | Nielsen | 198/365 |
| 3,935,822 | 2/1976 | Kaufmann . | |
| 3,977,513 | 8/1976 | Rushforth et al. | 414/339 X |
| 4,216,845 | 8/1980 | Tashman et al. | 198/831 X |
| 4,318,346 | 3/1982 | Sessum | 105/153 X |
| 4,532,385 | 7/1985 | Friske . | |

FOREIGN PATENT DOCUMENTS

| | | | |
|---|---|---|---|
| 432859 | 8/1926 | Fed. Rep. of Germany | 105/153 |
| 2037380 | 1/1972 | Fed. Rep. of Germany . | |
| 2973 | 1/1977 | Japan | 104/247 |
| 595599 | 12/1947 | United Kingdom . | |
| 622144 | 4/1949 | United Kingdom . | |
| 683699 | 12/1952 | United Kingdom . | |
| 2014938 | 9/1979 | United Kingdom . | |
| 2025348 | 1/1980 | United Kingdom . | |
| 2078187 | 1/1982 | United Kingdom . | |
| 2110448 | 6/1983 | United Kingdom . | |
| 2113683 | 8/1983 | United Kingdom . | |
| 2141580 | 1/1985 | United Kingdom . | |

Primary Examiner—Robert J. Spar
Assistant Examiner—Stuart J. Millman
Attorney, Agent, or Firm—Ladas & Parry

[57] ABSTRACT

A conveyor system or plant has linked carriages including at least one driver carriage which has a motor unit for moving the linked carriages along a rail path. The rail path has a pair of side rails on which freely-rotatable wheels of the carriages run and a central rail upon which the motor unit of the drive carriage acts. Power for the motor unit is taken, through sliding contacts, from feed rods along the path.

7 Claims, 7 Drawing Figures

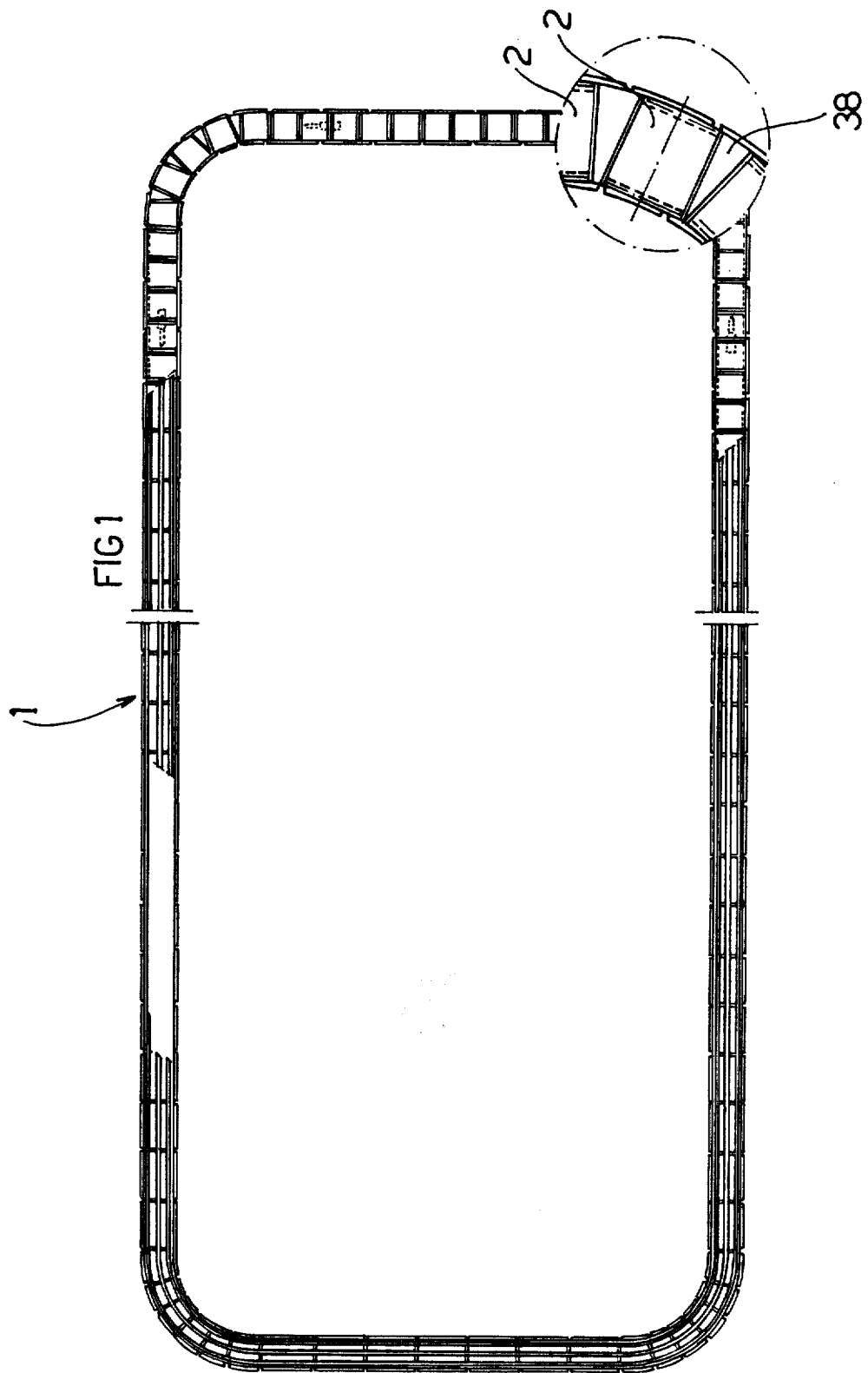

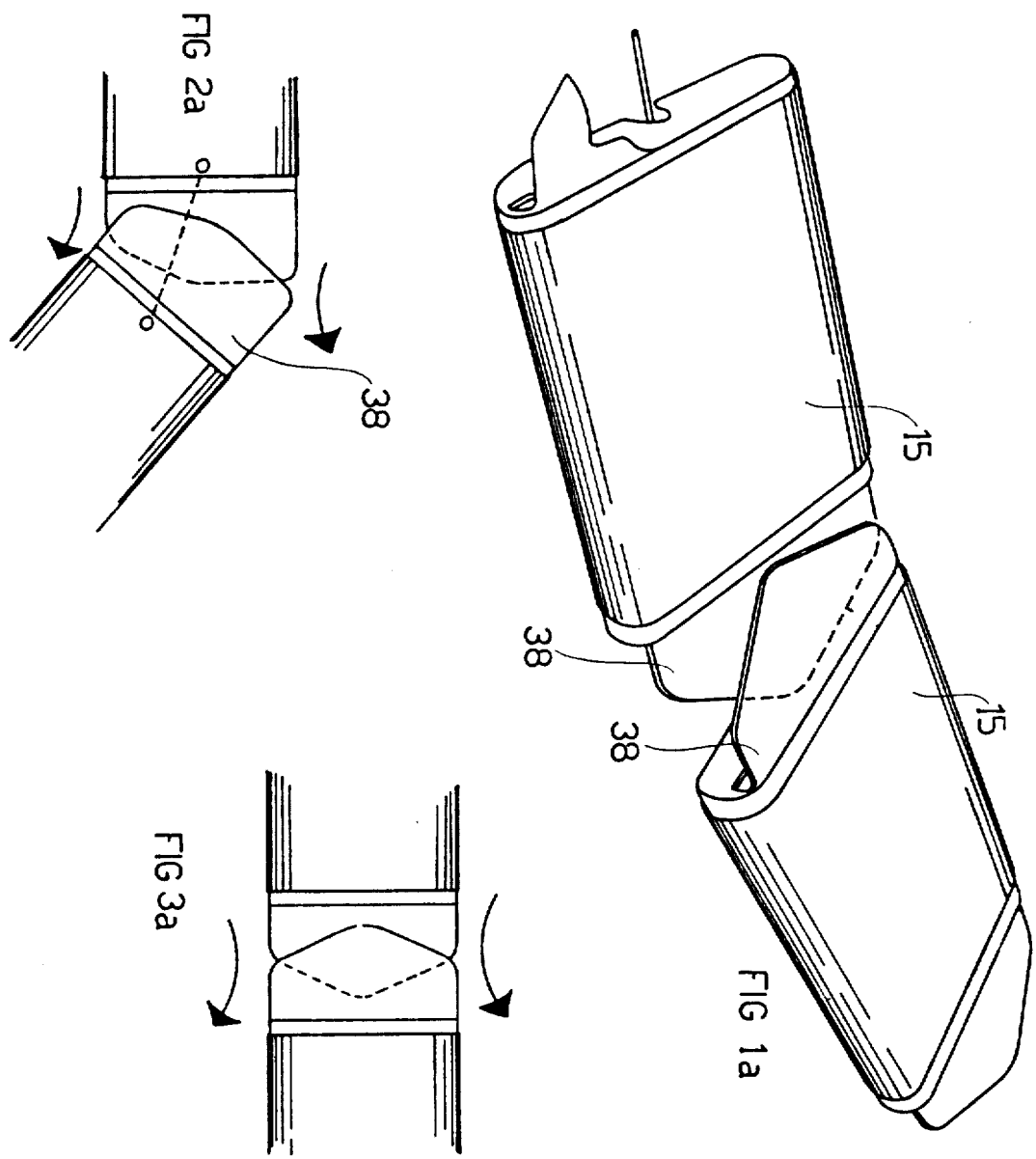

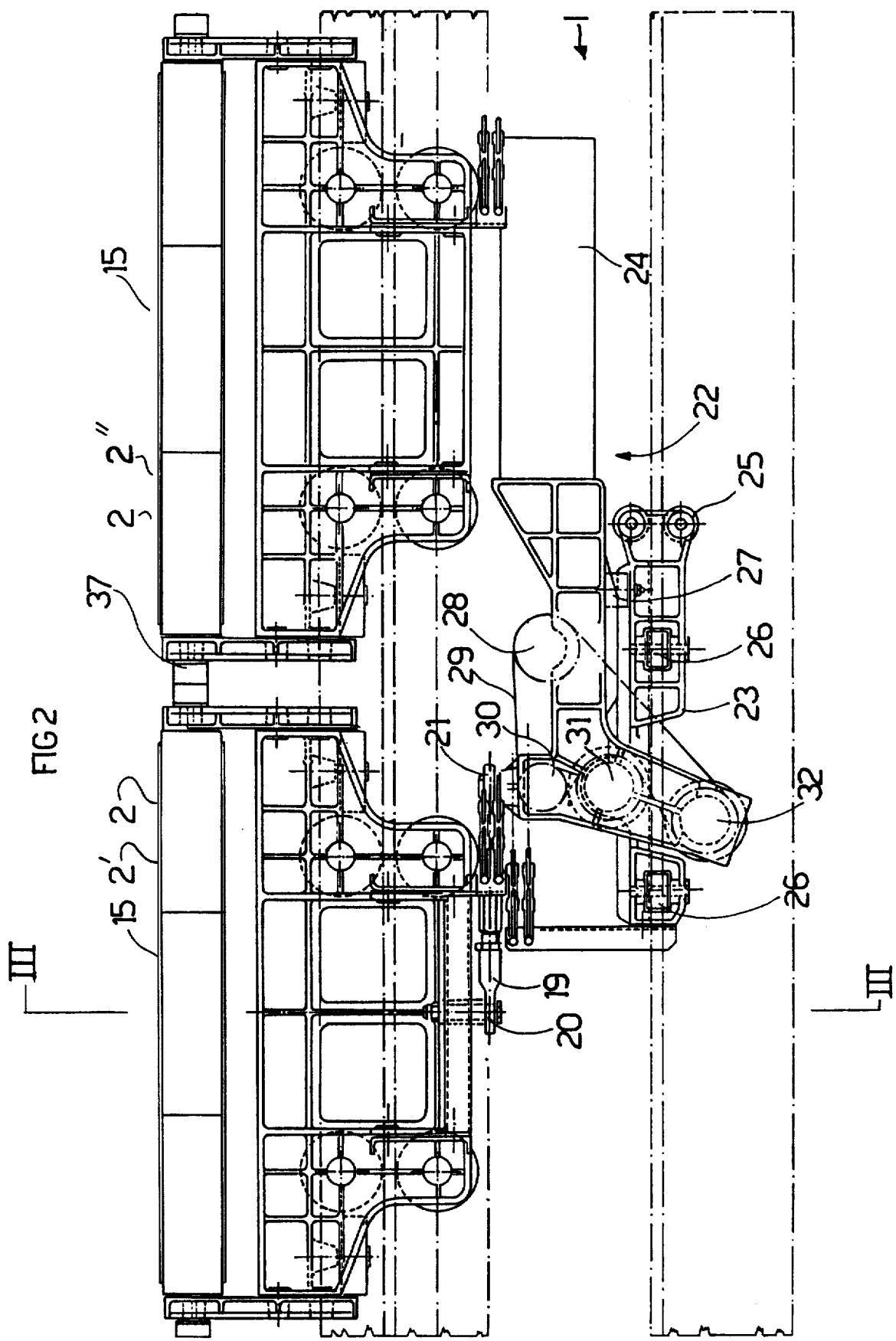

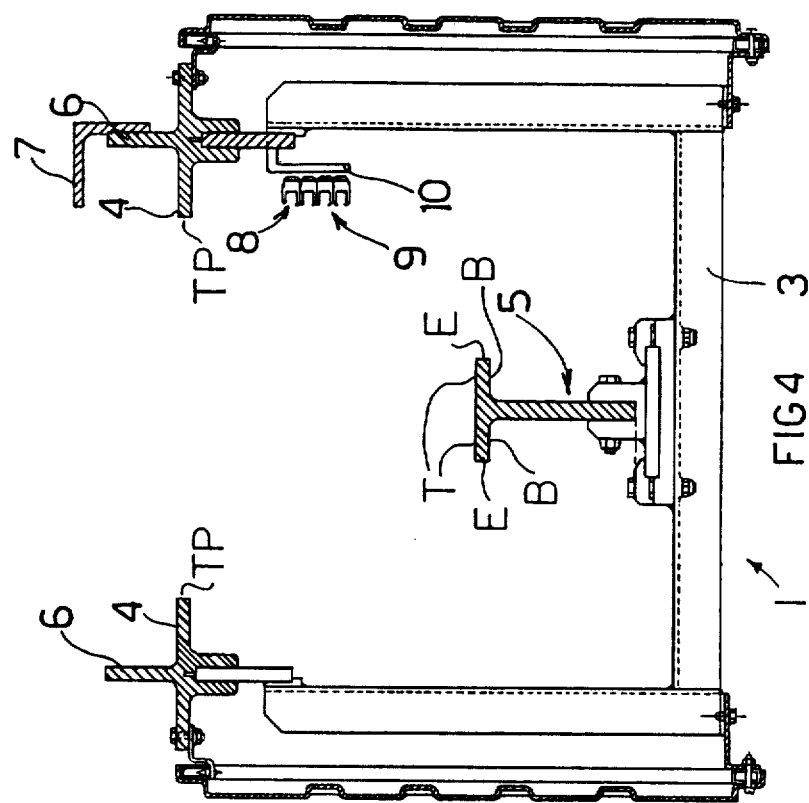
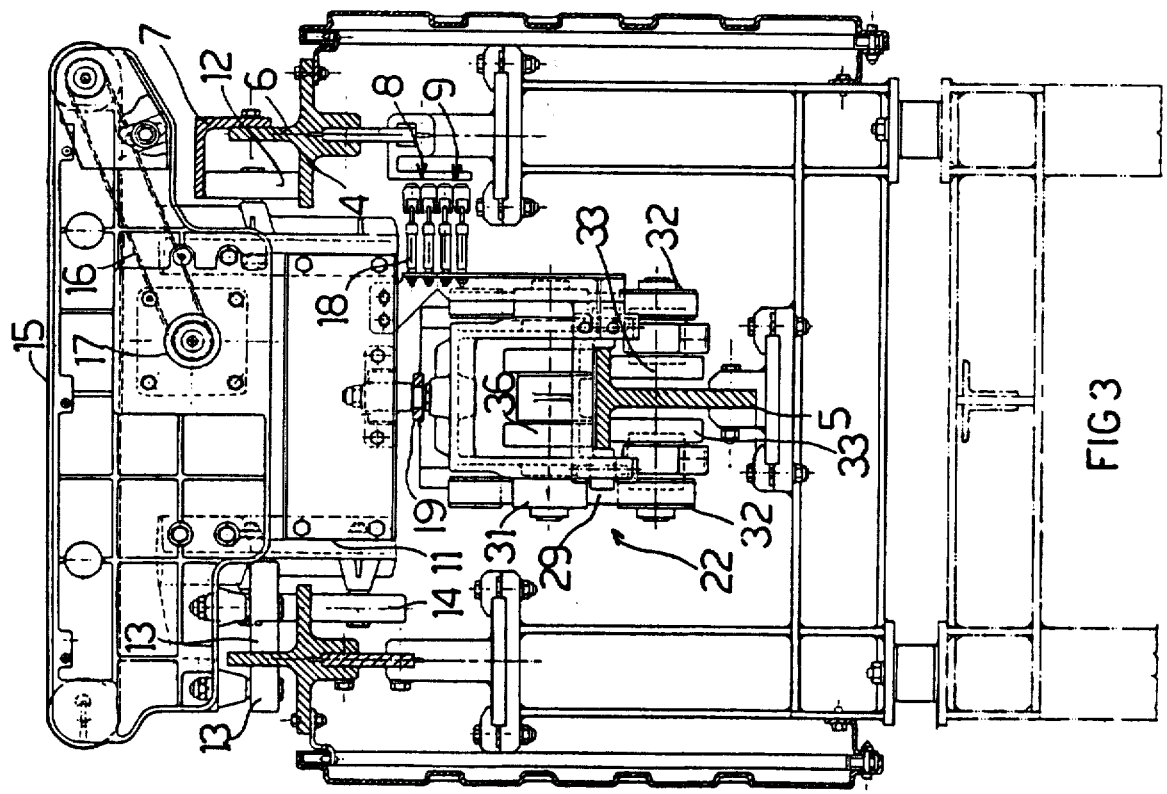

PLANT FOR SORTING ITEMS, WITH SELF DRIVEN CARRIAGES

The present invention provides, as a conveyor system or plant for sorting items, carriages having independent drives. More specifically, drive and driven carriages according to the invention move along a fixed path of a pair of side (i.e., uniformly spaced) rails on freely-rotatable (i.e., non-driving) wheels. Driving wheels associated with the drive carriage act on a central rail between the side rails. The apparatus is thus dramatically simplified, as it is possible to spare some of the carriages traction devices, this resulting in the apparatus being more flexible, more easily adaptable to various exigencies, lower in cost and easier to maintain.

There are known apparatuses for carrying and sorting items and small objects. They have a plurality of conveying planes, plates or the like dragged along a fixed path and devices that discharge the objects at convenient moments. In some cases, these devices make the plate tilt to either side. In others, pusher elements that run along the conveyor plane discharge the objects sideways, or in still other cases, there are similar systems. In all these known apparatuses, the carriages are driven by continuous dragging device, such as a chain or the like, and a single, fixed motor. This involves many inconveniences: the presence of continuous dragging means brings about complications in construction, especially in the case of nonlinear paths; further, when breakdowns occur, it is necessary to stop the whole apparatus to repair or replace the faulty parts; in the case of big plants, where there are a number of carriages, the drive devices are of considerable size, affecting thus the weight and cost of the whole system.

To obviate the above drawbacks, the present invention provides, for a plant for sorting items and small objects, carriages having independent driving means, allowing thus to considerably simplify all the fixed parts of the apparatus. This permits quick adaptation of the apparatus to any new exigency, e.g. varying the layout thereof or varying the number of units that convey and discharge the items. The whole system is moreover cheaper, and the maintenance thereof easier, without the need to stop the pant to effect repairs.

The present invention will be now described in detail, merely by way of non limiting example, with special reference to the attached drawings, in which:

FIG. 1 is the view from above of a plant according to the invention;

FIG. 2 is a sectional, side view of a pair of carriages used in the plant according to the invention, the one driving the other.

FIG. 3 is the section along line III—III of FIG. 2;

FIG. 4 is a section view of the fixed structure, in a plant according to the invention.

FIGS. 1a, 2a and 3a illustrate the operation of the plates according to the invention.

The plant comprises a fixed path, indicated as a whole by 1 in FIG. 1, along which move a plurality of carriages 2 on which the items to be sorted are laid. Path 1 comprises (see FIG. 4) a support frame 3 to which is secured a pair of uniformly-spaced, upper, side rails 4 and, substantially-centrally therebetween, an inner lower rail 5. Each side rail 4, which wheels of the carriages engage, has, in axial section, a substantially vertical upright portion or side wall 6 and a substantially-horizontal transverse portion TP preferably crossing the upright portion, but at least projecting from one side thereof toward the other side rail. To one of these walls 6 is fixed and angle iron 7 so positioned that its horizontal flange is over the substantially-horizontal portion of the corresponding side rail 4 projecting toward the other, as can be seen in the drawings. The inner or central rail 5, instead, has a T-shaped axial section i.e. a vertical web with oppositely-projecting transverse webs at the top, each transverse web having a top T and bottom B and edge E opposite that of the other therebetween. Finally, also along the path, there are two pairs of feed rods, i.e. bus bars, at 8 and 9, fixed to a support 10, the function of which will be hereinafter illustrated.

Carriages 2, that move along the path at 1, may be a drive carriage 2' (as that on the left in FIG. 2), or may be driven by the former, i.e. a driven carriage 2" (as that on the right in FIG. 2). The drive and the driven carriages are identical, except for a motor unit at 22 of the drive carriage.

Each carriage comprises (see FIGS. 2 and 3) a frame 11 on which is mounted, at one side, a freely-rotatable wheel 12 that slides within the guide formed by the substantially-horizontal portion of one side rail 4 and the horizontal flange of angle iron 7 thereover and, at the opposite side, two non-coaxial pairs each of freely-rotatable, section and third wheels 13 and 14, the former with vertical, and the latter with horizontal axes. Wheels 14 engage opposite sides of the substantially-horizontal portion of the other side rail 4, whilst wheels 13 engage opposite sides of substantially vertical portion or side wall 6 of that rail. The task of all the above mentioned wheels is that of allowing the carriage to run along the path at 1 without tilting.

On frame 11 is mounted a rotating belt 15, one, uppermost run of which is in a horizontal, conveyor plane for the items to be sorted. Belt rotation is driven, through a band 16 or the like, by a motor 17 on the carriage fed from the feed rods 8 via sliding contacts 18 therefor on the carriage. Motor 17 may be of any known type, but preferably is of the d.c. permanent magnet type which, due to its high acceleration and deceleration characteristics, allows more precise discharge, i.e. toward the side of wheel 12 or wheels 13, 14, of items placed on the uppermost run of the belt 15.

The frame 11 of the drive carriage 2' is linked to the motor unit at 22 by a union bar 19 with a hinge 20 and 21 at each end respectively thereto. The motor unit has a frame 23 on which is mounted, as a group, a transmission and an electric motor 24. The latter is emboss-fixed to a frame for the group. The motor unit at 22 runs along the central rail 5 on a pair of freely-rotatable wheels 25 with horizontal axes for running on a top and bottom of the transverse webs of the central rail and two pairs of freely-rotatable wheels 26 with spaced vertical axes for running on the edges of the transverse webs. The motor-transmission group is secured to the frame 23 by an elastic mount 27 of known type, so that it can oscillate relative to the frame 23, with the motor 24 on one side of the elastic mount in the direction the vertical axes of the wheels 26 are spaced.

The transmission comprises a pair of wheels 28 connected with motor 24, each for driving a toothed belt 29 or the like about tension pulleys 30 and 31 to rotate a toothed wheel 32. To the shafts of these wheels 32, respectively, are fixed drive wheels 33 that act, respectively, upon the lower surface or bottom of the transverse, flange portions of the central rail 5 on the opposite side of the elastic mount 27 from the motor 24.

Opposite, spaced from the horizontal-axis wheels 25 and acting on the upper surface of the flange, is a pair of freely-rotatable reference wheels 36. Because the elastic mount 27 for the motor-transmission group allows said group to oscillate with respect to the frame 23, the torque exerted by the weight of the emboss-mounted motor 24 keeps wheels 33 constantly pressed up against the flange or transverse portions of central rail 5, so as to ensure a sufficient traction and compensate for the wear-if any-of the parts that are in mutual contact.

The carriages 2 are all provided with jointed couplings of known type, so as to permit the tandem linkage thereof, and with shockproof bearings 37 (see FIG. 2) made of soft material therebetween. Between pairs of tandem carriages, there are also present plates 38 (indicated in FIG. 1 just schematically) immediately below the upper run of the belts 15 thereof. These plates have the function of making the plane consisting of successive, upper belt runs continuous, avoiding any gaps between one carriage and the subsequent one, expecially when the latter proceed along curved paths.

The invention operates as follows: A plurality of the carriages 2 linked to each other by the jointed are driven along the upper side rails 4 by the motor unit 22 of some driven carriages 2' of them which acts upon the central rail 5. The performance of the drive carriage depends on the kind of path, the weight of the carriages and the weight of the items to be sorted thereon. The plates 38 in the space between one carriage and the subsequent one make the conveyor plane continuous even when the carriages run along a curved path and therefore diverge from each other at one side. The plant operations are controlled by electronic devices of known type. The items to be sorted are laid by one or more operators, after a proper coding, operation on respectively corresponding carriages. The control devices feed tension, i.e. voltage, along feed rods 9 to the motors 24 for moving the carriages. When a carriage passes before the area where the conveyed item should be discharged, the control devices send through the feed rods 8 the current necessary for the motor 17 of that carriage to work. The latter, via a band 16, makes the belt 15 of that carriage rotate for discharging the conveyed item at one side of the path. Obviously, for this, the feed rods 8 are discontinuous and respectively set before the various discharge areas or stations. For driving the carriages, it is the very weight of each oscillatorily-mounted motor 24 that keeps the corresponding drive wheels 33 pressed against the flange of rail 5. The drive wheels are thus always pressed against rail 5 by constant strength, notwithstanding the wear that may occur. In the circumstances, an apparatus as above described is extremely flexible; it is even possible to use, for the same path, various numbers of carriages, according to the exigencies, without other modification of the plant being required. Each carriage may be provided with a motor unit, or a limited number of such drive carriages may be employed, the plant or conveyor system consisting, in this case, of a certain number of driven carriages dragged by the limited number of drive carriages, the latter being set at regular intervals. It is thus possible to spare motors and related driving devices that would necessarily remain entrained on the path; on the contrary, it is possible to vary at will the plant layout by simply displacing, adding or removing rails without any other intervention being necessary.

A person skilled in the art could then provide for many changes and variations, which should all fall, however, within the ambit of the present invention.

I claim:

1. A conveyor system for use in sorting items, comprising:
   a pair of uniformly-spaced side rails, each side rail having, in axial section, a substantially-vertical upright portion and a substantially-horizontal transverse portion projecting from one side of the upright portion toward the other side rail;
   a central rail substantially-centrally between the side rails and lower than the side rails, the central rail having a T-shaped axial section comprising oppositely-projecting transverse webs, each transverse web having a top and a bottom and an edge opposite that of the other transverse web therebetween;
   at least two carriages having coupling means for jointedly linking the carriages in tandem, each carriage comprising a freely-rotatable first wheel on one side for movement along the transverse portion of one of the side rails, two non-coaxial pairs of freely-rotatable second wheels on the other side, each pair of the second wheels engaging opposite side of the upright portion of the other of the side rails, two non-coaxial pairs of freely-rotatable third wheels engaging opposite sides of the transverse portion of the same side rail as engaged by the second wheels, belt means comprising a rotatable belt having an uppermost run defining a conveyor plane for items to be sorted and belt-rotating means for rotating the belt with the uppermost run moving toward one of the sides of the carriage for discharging the items from the conveyor plane;
   a motor unit for running along the cental rail, the motor unit comprising a frame, a pair of freelyl-rotatable wheels having horizontal axes for running on a top and a bottom of the transverse webs of the central rail, a pair of freely-rotatable reference wheels spaced from the latter for respectively acting on the tops of the transverse webs, two pair of freely-rotatable wheels having spaced vertical axes for running on the edged of the transverse webs, a motor-transmission group comprising a motor and a transmission therefor, an elastic mount oscillatorily securing the motor-transmission group to the frame with the motor on one side of the elastic mount in the direction in which the vertical axes of the two pair of wheels of the motor unit are spaced, the transmission comprising drive wheels rotated by the motor respectively acting on the bottoms of the transverse webs on the opposite side of the elastic mount from the motor, whereby the torque exerted by the weight of the motor keeps the drive wheels constantly pressed up against the transverse portions of the central rail; and
   a union bar having a hinge at each end respectively connected to one of the carriages and the motor unit, whereby the one carriage is a drive carriage and the other is a driven carriage.

2. The system according to claim 1, and further comprising a flanged angle iron so fixed on the upright portion of the one of the side rails that the flange thereof is horizontally over the transverse portion of the one side rail, whereby to guide the movement of the first wheel.

3. The system according to claim 1, wherein axes of rotation of the first and second wheels are substantially parallel to the transverse portions of the side rails.

4. The system according to claim 1, wherein axes of rotation of the third wheels are substantially parallel to each other and to the upright portion of each side rail.

5. The system according to claim 1, and further comprising feed rods along the rails and sliding contacts on the motor unit for engaging with the feed rods, whereby to provide power to the motor and belt-rotating means.

6. The system according to claim 5, wherein the feed rods for providing power to the belt-rotating means are discontinuous about a discharge area, whereby to control discharge thereat.

7. The system according to claim 1, and further comprising, between tandem carriages, plate means for making the conveyor plane thereby continuous when the carriages run along curved rails.

* * * * *

UNITED STATES PATENT AND TRADEMARK OFFICE
CERTIFICATE OF CORRECTION

PATENT NO. : 4,712,965

DATED : December 15, 1987

INVENTOR(S) : Francesco Canziani

It is certified that error appears in the above-identified patent and that said Letters Patent is hereby corrected as shown below:

On the title page, column 1, before "[51]" insert a subtitle --[30] Foreign Application Priority Data -- and data -- August 8, 1984 Italy ..... 22264 A/84 --.

Signed and Sealed this

Seventh Day of June, 1988

Attest:

DONALD J. QUIGG

Attesting Officer

Commissioner of Patents and Trademarks